United States Patent [19]
Mah et al.

[11] Patent Number: 5,863,395
[45] Date of Patent: Jan. 26, 1999

[54] ELECTROCHEMICAL CELL HAVING A SELF-REGULATING GAS DIFFUSION LAYER

[75] Inventors: Dennie Turin Mah, Wilmington, Del.; Clarence Garlan Law, Jr., West Trenton, N.J.; James Arthur Trainham, III, Greenville, Del.; John Scott Newman, Kensington, Calif.

[73] Assignee: E. I. du Pont de Nemours and Company, Wilmington, Del.

[21] Appl. No.: 969,707

[22] Filed: Nov. 28, 1997

Related U.S. Application Data

[63] Continuation of Ser. No. 432,388, May 1, 1995, abandoned, which is a continuation-in-part of Ser. No. 156,196, Nov. 22, 1993, Pat. No. 5,411,641, and Ser. No. 246,909, May 20, 1994, Pat. No. 5,580,437.

[51] Int. Cl.$^6$ .................................................. C25B 9/00
[52] U.S. Cl. .......................... 204/252; 204/282; 204/283; 204/290 R; 429/30; 429/33
[58] Field of Search .................................... 204/282, 283, 204/252, 290 R; 429/30, 33

[56] References Cited

U.S. PATENT DOCUMENTS

| | | | |
|---|---|---|---|
| 3,453,187 | 7/1969 | Slatin | 204/69 |
| 3,729,395 | 4/1973 | Caron et al. | 204/59 R |
| 4,139,447 | 2/1979 | Faron et al. | 204/239 |
| 4,169,025 | 9/1979 | Needes | 204/98 |
| 4,191,618 | 3/1980 | Coker et al. | 204/98 |
| 4,210,501 | 7/1980 | Dempsey et al. | 204/129 |
| 4,214,969 | 7/1980 | Lawrance | 204/255 |
| 4,224,121 | 9/1980 | Dempsey et al. | 204/98 |
| 4,247,376 | 1/1981 | Dempsey et al. | 204/252 |
| 4,294,671 | 10/1981 | Balko | 204/128 |
| 4,311,568 | 1/1982 | Balko | 204/128 |
| 4,343,690 | 8/1982 | de Nora | 204/263 |
| 4,457,822 | 7/1984 | Asano et al. | 204/284 |
| 4,595,579 | 6/1986 | Prudhon et al. | 423/487 |
| 4,655,887 | 4/1987 | Oda et al. | 204/98 |
| 4,666,574 | 5/1987 | Oda et al. | 204/98 |
| 4,909,912 | 3/1990 | Oda et al. | 204/98 |
| 4,959,132 | 9/1990 | Fedkiw, Jr. | 204/101 |
| 5,223,102 | 6/1993 | Fedkiw, Jr. et al. | 204/78 |
| 5,399,184 | 3/1995 | Harada | 29/623.4 |
| 5,460,705 | 10/1995 | Murphy et al. | 204/252 |
| 5,460,896 | 10/1995 | Takada et al. | 429/42 |

FOREIGN PATENT DOCUMENTS

| | | |
|---|---|---|
| 389 020 | 10/1989 | Australia . |
| 1 179 631 | 12/1984 | Canada . |
| 1 195 949 | 10/1985 | Canada . |
| 0 319 489 | 6/1989 | European Pat. Off. . |
| 2 321 297 | 3/1973 | Germany . |
| 56-36873 | 8/1981 | Japan . |
| 363424 | 12/1931 | United Kingdom . |
| 861978 | 3/1961 | United Kingdom . |
| 2 073 251 | 10/1981 | United Kingdom . |

OTHER PUBLICATIONS

Wilson, M.S. et al., High Preformance Catalyzed Membranes of Ultra–low Pt Loadings for Polymer Electrolyte Fuel Cells, *J. Electrochem. Soc.*, 2, L–28 — L–30, Feb. 1992.

(List continued on next page.)

*Primary Examiner*—Kathryn L. Gorgos

[57] ABSTRACT

The invention relates to an electrochemical cell having an electrode with a catalyst layer and a gas diffusion layer. The cell also includes a mass flow field for directing fluid to and away from the electrode. An additional gas diffusion layer is disposed between the gas diffusion layer and the flow field. This increases the diffusion resistance of the fluid. The electrochemical cell of the present invention is particularly useful in a process for electrochemically converting anhydrous hydrogen halide to essentially dry halogen gas, where it is necessary to control and increase limiting current. It is also possible to use the additional gas diffusion layer in an aqueous process electrochemical cell.

25 Claims, 2 Drawing Sheets

OTHER PUBLICATIONS

Jewulski, J. R., et al., Solid State Proton Conductors, *Final Report, Work Performed Under Contract No.: DE-AC21-88MC24218 for U.S. Department of Energy*, 1–99, Dec. 12, 1990.

Minz, F.R. (Dr.), HCl–Electrolysis—Technolgy for Recycling Chlorine, *Bayer AG*, No date available.

Takenaka, H., et al., Solid Polymer Electrolyte Water Electrolysis, *Int. J. Hydrogen Energy*, 7(5), 397–403, 1982, No month available.

Appleby, A.J. et al., Solid Polymer Acid Electrolytes, *Fuel Cell Handbook*, 10, 308–312, 1989.

ELECTROCHEMICAL CELL HAVING A SELF-REGULATING GAS DIFFUSION LAYER

This application is a continuation of U.S. application Ser. No. 08/432,388, filed May 1, 1995, abandoned, which is a continuation-in-part of U.S. application Ser. No. 08/156,196, filed Nov. 22, 1993, now U.S. Pat. No. 5,411,641 which was surrendered in favor of U.S. reissue application Ser. No. 09/093,468 filed Jan. 8, 1998, pending, and a continuation-in-part of U.S. application Ser. No. 08/246,909, filed May 20, 1994, now U.S. Pat. No. 5,580,437, which was surrendered in favor of U.S. reissue application Ser. No. 09/093,535 filed Jun. 8, 1998, pending.

BACKGROUND OF THE INVENTION

1. Field of the Invention

The present invention relates to an electrochemical cell and process for converting essentially anhydrous hydrogen halide to essentially dry halogen gas. The process of the present invention is useful for converting anhydrous hydrogen halide, in particular, hydrogen chloride, hydrogen fluoride, hydrogen bromide and hydrogen iodide, to a halogen gas, such as chlorine, fluorine, bromine, or iodine. In particular, in the present invention, the electrochemical cell has a mass flow field that increases the diffusion resistance of a fluid within either a cathode or an anode compartment of the cell.

2. Description of the Related Art

Hydrogen chloride (HCl) or hydrochloric acid is a reaction by-product of many manufacturing processes which use chlorine. For example, chlorine is used to manufacture polyvinyl chloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product.

A number of commercial processes have been developed to convert HCl into usable chlorine gas. See, e.g., F. R. Minz, "HCl-Electrolysis—Technology for Recycling Chlorine", Bayer AG, Conference on Electrochemical Processing, Innovation & Progress, Glasgow, Scotland, UK, 4/21–4/23, 1993.

Currently, thermal catalytic oxidation processes exist for converting anhydrous HCl and aqueous HCl into chlorine. Commercial processes, known as the "Shell-Chlor", the "Kel-Chlor" and the MT-Chlor" processes, are based on the Deacon reaction. The original Deacon reaction as developed in the 1870's made use of a fluidized bed containing a copper chloride salt which acted as the catalyst. The Deacon reaction is generally expressed as follows:

$$4HCl + O_2 \xrightarrow{\text{Catalyst}} 2Cl_2 + 2H_2O \quad (1)$$

where the following catalysts may be used, depending on the reaction or process in which equation (1) is used.

| Catalyst | Reaction or Process |
|---|---|
| Cu | Deacon |
| Cu, Rare Earth, Alkali | Shell-Chlor |
| $NO_2$, $NOHSO_4$ | Kel-Chlor |
| $Cr_mO_n$ | MT-Chlor |

The commercial improvements to the Deacon reaction have used other catalysts in addition to or in place of the copper used in the Deacon reaction, such as rare earth compounds, various forms of nitrogen oxide, and chromium oxide, in order to improve the rate of conversion, to reduce the energy input and to reduce the corrosive effects on the processing equipment produced by harsh chemical reaction conditions. However, in general, these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 250° C. and above.

Electrochemical processes exist for converting aqueous HCl to chlorine gas by passage of direct electrical current through the solution. The current electrochemical commercial process is known as the Uhde process. In the Uhde process, aqueous HCl solution of approximately 22% is fed at 65° to 80° C. to both compartments of an electrochemical cell, where exposure to a direct current in the cell results in an electrochemical reaction and a decrease in HCl concentration to 17% with the production of chlorine gas and hydrogen gas. A polymeric separator divides the two compartments. The process requires recycling of dilute (17%) HCl solution produced during the electrolysis step and regenerating an HCl solution of 22% for feed to the electrochemical cell. The overall reaction of the Uhde process is expressed by the equation:

$$2HCl \text{ (aqueous)} \xrightarrow{\text{Electrical Energy}} H_2 \text{(wet)} + Cl_2 \text{(wet)} \quad (2)$$

As is apparent from equation (2), the chlorine gas produced by the Uhde process is wet, usually containing about 1% to 2% water. This wet chlorine gas must then be further processed to produce a dry, usable gas. If the concentration of HCl in the water becomes too low, it is possible for oxygen to be generated from the water present in the Uhde process. This possible side reaction of the Uhde process due to the presence of water, is expressed by the equation:

$$2H_2O \rightarrow O_2 + 4H^+ + 4e^- \quad (3)$$

Further, the presence of water in the Uhde system limits the current densities at which the cells can perform to less than 500 amps/ft$^2$, because of this side reaction. The side reaction results in reduced electrical efficiency and corrosion of the cell components.

Another electrochemical process for processing aqueous HCl has been described in U.S. Pat. No. 4,311,568 to Balko. Balko employs an electrolytic cell having a solid polymer electrolyte membrane. Hydrogen chloride, in the form of hydrogen ions and chloride ions in aqueous solution, is introduced into an electrolytic cell. The solid polymer electrolyte membrane is bonded to the anode to permit transport from the anode surface into the membrane. In Balko, controlling and minimizing the oxygen evolution side reaction is an important consideration. Evolution of oxygen decreases cell efficiency and leads to rapid corrosion of components of the cell. The design and configuration of the anode pore size and electrode thickness employed by Balko maximizes transport of the chloride ions. This results in effective chlorine evolution while minimizing the evolution of oxygen, since oxygen evolution tends to increase under conditions of chloride ion depletion near the anode surface. In Balko, although oxygen evolution may be minimized, it is not eliminated. As can be seen from FIGS. 3 to 5 of Balko, as the overall current density is increased, the rate of oxygen evolution increases, as evidenced by the increase in the concentration of oxygen found in the chlorine produced. Balko can run at higher current densities, but is limited by the deleterious effects of oxygen evolution. If the Balko cell were to be run at high current densities, the anode would be destroyed.

In an electrochemical cell, the conductivity of a membrane is directly related to the water content in the membrane and decreases at low water content. Limiting current density occurs when the concentration of water within the membrane reaches a value that will no longer support additional proton conduction. Therefore, limiting current density can develop when the conductivity decreases due to low water concentrations. It is important to regulate limiting current so that the components of the cell are not destroyed.

Use of a thin, foraminous flexible sheet such as fine mesh stainless steel, nickel screen, stainless steel or graphite paper interposed between an electrode and a compressible current collector in an electrolytic cell which processes an aqueous sodium chloride solution is disclosed in U.S. Pat. No. 4,343,690 to de Nora. The purpose of this sheet is to protect the electrode from the collector. It also provides a greater total contact area than would be provided by the current collector alone, since the current collector in this patent, being an open mesh metal wire screen, is more open in its construction than known current collectors. In this de Nora patent, there is no recognition of a desire to increase the diffusion resistance of the fluid in the electrode compartment.

There exists a need for directly producing essentially dry halogen gas without having to first dissolve the hydrogen halide in water, and for decreasing the diffusion resistance of water in the membrane during such a process. This would allow the limiting current density of the cell to be increased and/or controlled, so that the cell components would not be destroyed. It would be especially desirable to provide a self-regulating mechanism within a cell which would internally control limiting current, without having to externally adjust the parameters of the cell.

SUMMARY OF THE INVENTION

The present invention solves the problems of the prior art by providing an electrochemical cell and process for directly producing essentially dry halogen gas from essentially anhydrous hydrogen halide. This cell and process process allows for direct processing of anhydrous hydrogen halide which is a by-product of manufacturing processes, without first dissolving the hydrogen halide in water. This direct production of essentially dry halogen gas, when done, for example, for chlorine gas, is less capital intensive than processes of the prior art, which require separation of water from the chlorine gas. This direct production of essentially dry chlorine gas also requires lower investment costs than the electrochemical conversions of hydrogen chloride of the prior art. This advantage can translate directly into lower power costs per pound of say, chlorine, generated than in the aqueous electrochemical processes of the prior art. The direct production of essentially dry chlorine gas also provides a process which produces drier chlorine gas with fewer processing steps as compared to that produced by electrochemical or catalytic systems of the prior art, thereby simplifying processing conditions and reducing capital costs.

The present invention increases the diffusion resistance of the fluid in the electrode compartment of an electrochemical cell. By increasing the diffusion resistance of the fluid, a self-regulating cell is established with respect to the maximum steady-state current which the cell may draw. In turn, this allows an electrochemical cell to be designed in which a valuable component, such as the cation-exchange membrane, is protected from prolonged exposure to excessive current, which could deteriorate the membrane, and thus impact the membrane's and the cell's long-term performance. These advantages of the cell of the present invention make the process of the present invention even more practicable and economically attractive.

To achieve the foregoing solutions, and in accordance with the purposes of the invention as embodied and broadly described herein, there is provided a cell for directly producing essentially essentially dry halogen gas from essentially anhydrous hydrogen halide. The electrochemical cell comprises means for oxidizing molecules of essentially anhydrous hydrogen halide to produce essentially dry halogen gas and protons; cation-transporting means for transporting the protons therethrough, where the oxidizing means is disposed in contact with one side of the cation-transporting means; means for reducing the transported protons, wherein the reducing means is disposed in contact with the other side of the cation-transporting means and the reducing means has a compartment for containing fluid therein; a mass flow field disposed on the other side of the reducing means for directing fluid to and away from the reducing means; and means disposed between the reducing means and the mass flow field for increasing the diffusion resistance of the fluid.

DESCRIPTION OF THE PREFERRED EMBODIMENTS

Reference will now be made in detail to the present preferred embodiments of the invention as illustrated in the accompanying drawings.

In accordance with a first and second embodiment of the present invention, there is provided an electrochemical cell for the direct production of essentially dry halogen gas from anhydrous hydrogen halide. Such a cell is shown generally at 10 in FIG. 1. The cell of the present invention will be described with respect to a preferred embodiment of the present invention, which directly produces essentially dry chlorine gas from anhydrous hydrogen chloride. This cell may alternatively be used to produce other halogen gases, such as bromine, fluorine and iodine from a respective anhydrous hydrogen halide, such as hydrogen bromide, hydrogen fluoride and hydrogen iodide. The term "direct" means that the electrochemical cell obviates the need to remove water from the halogen gas produced or the need to convert essentially anhydrous hydrogen halide to aqueous hydrogen halide before electrochemical treatment. In the first embodiment, chlorine gas, as well as hydrogen, is produced in this cell. In a second embodiment, water, as well as chlorine gas, is produced by this cell, as will be explained more fully below.

Figure 1:
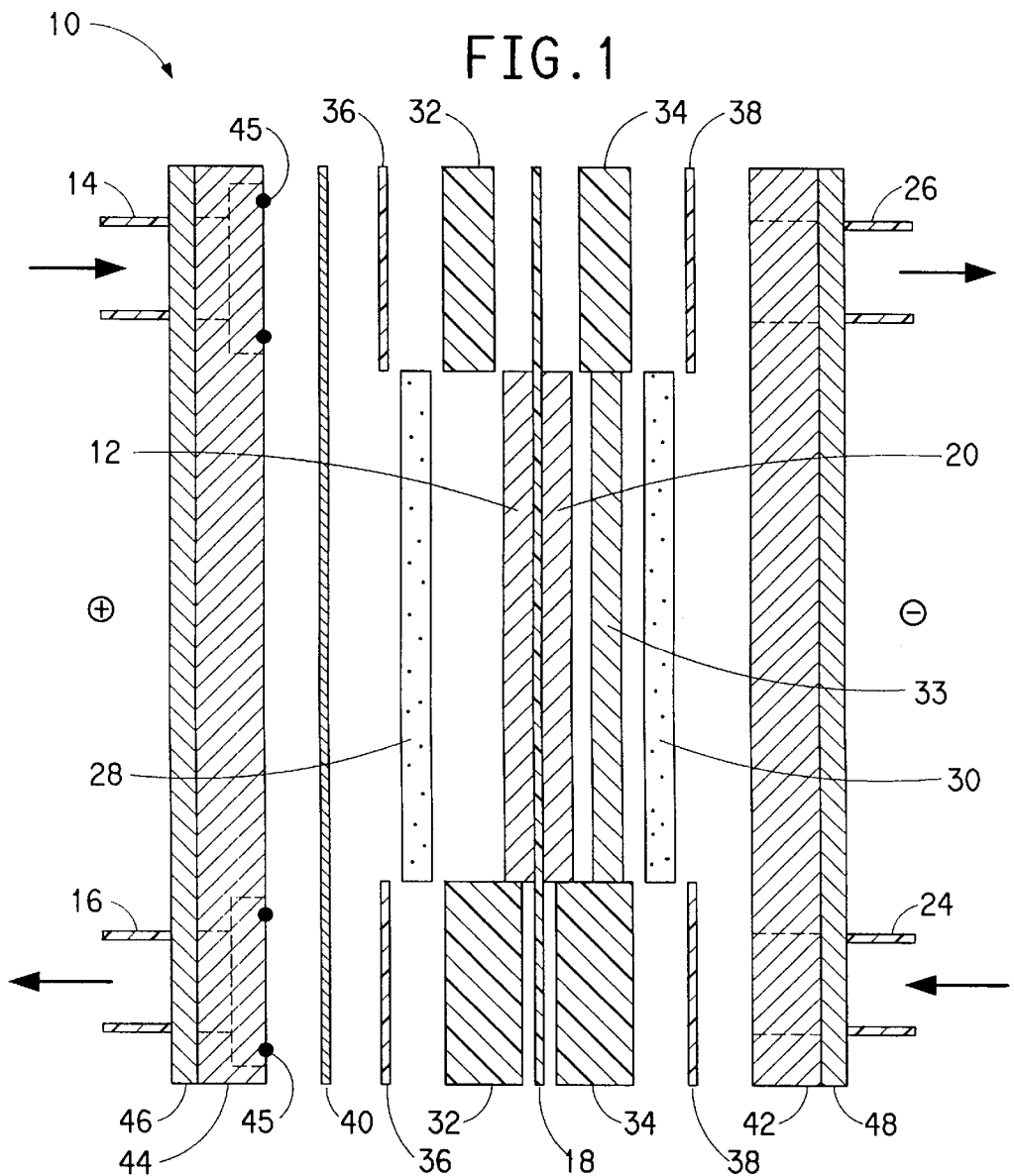
FIG. 1 is an exploded cross-sectional view of an electrochemical cell for producing halogen gas from anhydrous hydrogen halide according to a first and a second embodiment of the present invention.
Figure 1A:
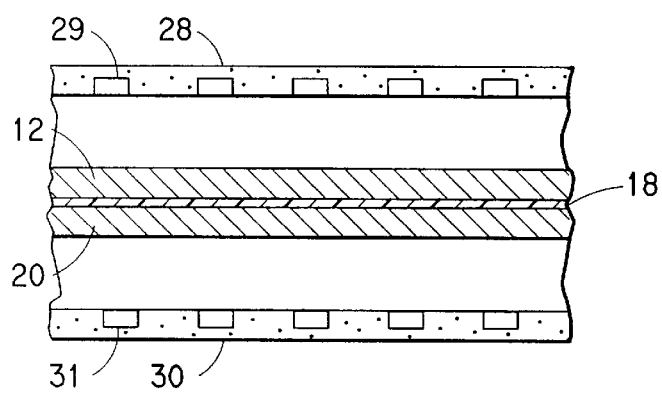
FIG. 1A is a cut-away, top cross-sectional view of the anode and cathode mass flow fields as shown in FIG. 1.

The electrochemical cell of the first and second embodiments comprises means for oxidizing molecules of essentially anhydrous hydrogen halide to produce essentially dry halogen gas and protons. The oxidizing means is an electrode, or more specifically, an anode 12 as shown in FIGS. 1 and 1A. On the anode side, electrochemical cell 10 has an anode-side inlet 14 and an anode-side outlet 16. Since in the preferred embodiment, anhydrous HCl is carried through the inlet, and chlorine gas is carried through the outlet, the inlet and the outlet may be lined with a copolymer of tetrafluoroethylene with (perfluoro)alkyl-vinyl ether, sold under the trademark "TEFLON® PFA" (hereinafter referred to as ("PFA") by E. I. du Pont de Nemours and Company of Wilmington, Del. (hereinafter referred to as "DuPont").

The electrochemical cell of the first and second embodiments also comprises cation-transporting means for transporting the protons therethrough, where one side of the oxidizing means is disposed in contact with one side of the cation-transporting means. Preferably, the cation-transporting means is a cation-transporting membrane 18 as shown in FIGS. 1 and 1A. More specifically, membrane 18 may be a proton-conducting membrane. Membrane 18 may be a commercial cationic membrane made of a fluoro- or perfluoropolymer, preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type $-CF_2CFRSO_3H$ and $-OCF_2CF_2CF_2SO_3H$, where R is an F, Cl, $CF_2Cl$, or a $C_1$ to $C_{10}$ perfluoroalkyl radical. The membrane resin may be, for example, a copolymer of tetrafluoroethylene with $CF_2=CFOCF_2CF(CF_3)$ $OCF_2CF_2SO_3H$. Sometimes, those resins may be in the form that has pendant $-SO_2F$ groups, rather than $-SO_3H$ groups. The sulfonyl fluoride groups can be hydrolyzed with potassium hydroxide to $-SO_3K$ groups, which then are exchanged with an acid to $-SO_3H$ groups. Suitable perfluorinated cationic membranes, which are made of hydrated, copolymers of polytetrafluoroethylene and poly-sulfonyl fluoride vinyl ether-containing pendant sulfonic acid groups, are offered by DuPont under the trademark "NAFION" (hereinafter referred to as NAFION®). In particular, NAFION® membranes containing pendant sulfonic acid groups include NAFION®) 117, NAFION® 324 and NAFION® 417. The first type of NAFION® is unsupported and has an equivalent weight of 1100 g., equivalent weight being defined as the amount of resin required to neutralize one liter of a 1M sodium hydroxide solution. The other two types of NAFION® are both supported on a fluorocarbon fabric, the equivalent weight of NAFION® 417 also being 1100 g. NAFION® 324 has a two-layer structure, a 125 μm-thick membrane having an equivalent weight of 1100 g., and a 25 μm-thick membrane having an equivalent weight of 1500 g.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure $Na_2O_x.Al_2O_3$, in which x ranges from 5 (β"-alumina) to 11 (β-alumina). This material and a number of solid electrolytes which are useful for the invention are described in the *Fuel Cell Handbook,* A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O_{3-\alpha}$) and barium neodymiate cerate ($BaCe_{0.9}Nd_{0.01}O_{3-\alpha}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill., December, 1990.

The electrochemical cell of the first and second embodiments also comprises means for reducing the transported protons, where the reducing means is disposed in contact with the other side of the cation-transporting means. The reducing means is an electrode, or more specifically a cathode 20, where cathode 20 is disposed in contact with the other side (as opposed to the side which is in contact with the anode) of membrane 18 as illustrated in FIGS. 1 and 1A. Electrochemical cell 10 has a cathode-side inlet 24 and a cathode-side outlet 26 as shown in FIG. 1. Since in the preferred embodiment, anhydrous HCl is processed, and since some chlorides pass through the membrane and consequently, HCl is present on the cathode-side of the cell, the cathode inlet and the outlet may be lined with PFA.

As known to one skilled in the art, if electrodes are placed on opposite faces of membrane, cationic charges (protons in the HCl reaction being described) are transported through the membrane from anode to cathode, while each electrode carries out a half-cell reaction. In the first and second embodiments, molecules of anhydrous hydrogen chloride are transported to the surface of the anode through anode-side inlet 14. The molecules of the anhydrous hydrogen chloride are oxidized to produce essentially dry chlorine gas and protons. The essentially dry chlorine gas exits through anode-side outlet 16 as shown in FIG. 1. The protons, $H^+$, are transported through the membrane and reduced at the cathode. This is explained in more detail below.

The anode and the cathode may comprise porous, gas-diffusion electrodes. Such electrodes provide the advantage of high specific surface area, as known to one skilled in the art. The anode and the cathode comprise an electrochemically active material, or catalyst layer, disposed adjacent, meaning at or under, the surface of the cation-transporting membrane. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium or zirconium and the oxides, alloys or mixtures thereof. However, in general, the oxides of these materials are not used for the cathode. Other catalyst materials suitable for use with the present invention may include, but are not limited to, transition metal macro cycles in monomeric and polymeric forms and transition metal oxides, including perovskites and pyrochores.

In a hot-pressed electrode, the electrochemically active material may comprise a catalyst material on a support material. The support material may comprise particles of carbon and particles of a copolymer of tetrafluoroethylene with (perfluoro)alkyl-vinyl ether, sold under the trademark "TEFLON® PFA" (hereinafter referred to as ("PFA"), commercially available from DuPont. The electrochemically active material may be bonded by virtue of the PTFE® to a support structure, or gas diffusion layer, of carbon paper or graphite cloth and hot-pressed to the cation-transporting membrane. The hydrophobic nature of PTFE does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 0.50 mg/cm$^2$. Lower loadings are possible with other available methods of deposition, such as distributing them as thin films from inks onto the membranes, as described in Wilson and Gottesfeld, "High Performance Catalyzed Membranes of Ultra-low Pt Loadings for Polymer Electrolyte Fuel Cells", Los Alamos National Laboratory, J. Electrochem. Soc., Vol. 139, No. 2 L28–30, 1992, where the inks contain solubilized NAFION® ionomer to enhance the catalyst-ionomer surface contact and to act as a binder to the NAFION® perfluorinated membrane sheet. With such a system, loadings as low as 0.017 mg active material per cm$^2$ have been achieved.

The electrochemical cell of the first and second embodiments further comprises an anode mass flow field 28 disposed in contact with the anode and a cathode mass flow field 30 disposed in contact with the cathode. The flow fields are electrically conductive, and act as both mass and current flow fields. More specifically, the mass flow fields may include a plurality of anode flow channels 29 and a plurality of cathode flow channels 31 as shown in FIG. 1A. Anode flow field and channels 29 direct reactants, such as anhydrous HCl in the first and second embodiments, to the anode and products, such as essentially dry chlorine gas, from the anode. Cathode flow field 30 and channels 31 direct catholyte, such as liquid water in the first embodiment, or oxygen gas in the second embodiment, to the cathode and products, such as hydrogen gas in the first embodiment, or water vapor ($H_2O(g)$) in the second embodiment, from the cathode. Water vapor may be needed to keep the membrane hydrated. However, water vapor may not be necessary in this embodiment because of the water produced by the electrochemical reaction of the oxygen ($O_2$) added as discussed below. The anode and the cathode mass flow fields may comprise grooved porous graphite paper. The flow fields may also be made of a porous carbon in the form of a foam, cloth or matte.

The electrochemical cell of the first and second embodiments may also comprise an anode mass flow manifold 32 and a cathode mass flow field manifold 34 as shown in FIG. 1. The purpose of such manifolds is to bring anolyte to and products from the anode, and catholyte to and products from the cathode. In addition, the manifolds form a frame around the anode mass flow field and the anode, and the cathode mass flow field and the cathode, respectively. These manifolds are preferably made of a corrosion resistant material, such PFA. A gasket 36, 38, also contributes to forming a frame around the respective anode and cathode mass flow fields. These gaskets are preferably also made of a corrosion resistant material, such as PTFE.

When current is supplied to the electrochemical cell of the first and second embodiments, molecules of essentially anhydrous hydrogen halide are fed to the inlet of the cell and are transported to the anode. The molecules of the essentially anhydrous hydrogen halide are oxidized at the anode to produce essentially dry halogen gas and protons. The current supplied to the cell causes the protons to be transported through the cation-transporting membrane, and the transported protons are reduced at the cathode. A fluid, as either liquid water in the first embodiment, or an oxygen-containing gas in the second embodiment, is supplied to the cathode-side of the membrane. The water in the first embodiment or the water formed in the second embodiment, as will be explained below, is transported by diffusion towards the anode. The transported protons drag the water in the membrane towards the cathode. The amount of current required to achieve a balance between the water transported by diffusion toward the anode and dragged by the proton transport toward the cathode is controlled by adjusting the amount of water supplied to the membrane. Limiting current occurs when this balance is achieved. It is important to regulate limiting current so that the components of the cell are not destroyed.

Accordingly, the electrochemical cell of the present invention includes means for increasing the diffusion resistance of the fluid which is directed to and away from the electrode by the mass flow field. In the preferred case of the first and second embodiments, it is desirable to increase the diffusion resistance of the water supplied through the cathode inlet to the cathode compartment. As noted above, the electrodes of the present invention comprise a catalyst layer. In addition, the electrodes comprise a gas diffusion layer, disposed in contact with the catalyst layer on the side of the catalyst layer facing away from the membrane. Applicants have found that by increasing (or conversely decreasing) the thickness of the gas diffusion layer, the diffusion resistance of the water in the cathode compartment may be increased (or conversely decreased). Thus, the diffusion resistance means of the present invention comprises an additional gas diffusion layer 33 as shown in FIG. 1. By increasing the diffusion resistance of the water in the cathode compartment, the additional diffusion layer of the present invention increases limiting current by increasing the amount of current required to achieve a balance between the water transported by diffusion toward the anode and dragged by the proton transport toward the cathode. This protects the membrane by controlling the amount of water in the membrane, internally within the cell. The additional diffusion layer is self-regulating in that, by its inclusion, the cell of the present invention will achieve this balance on its own, without having to externally adjust the amount of water supplied to the membrane.

Increasing the diffusion resistance of the fluid in the electrode compartment is especially important at the cathode, where all the water in the cathode compartment has to go through the diffusion layer. It is also possible to place the additional diffusion layer on the anode side, although this is not shown. However, this is not preferable in the first and second embodiments, as it could limit the access of the hydrogen halide to the catalyst.

As noted above, the gas diffusion layer of the electrode is usually made of carbon paper or graphite cloth. The additional gas diffusion layer may also be made of carbon paper or graphite paper or cloth. In fact, the additional gas diffusion layer may be made of any porous conductive material. It should be noted that the use of an additional gas diffusion layer is useful with an electrochemically active material which is disposed at or under the surface of the cation-transporting membrane, which is applied directly to the membrane, or which is hot-pressed to the membrane.

The diffusion resistance may also be adjusted by adjusting the hydrophobicity of the gas diffusion layer of the electrode and/or of the additional gas diffusion layer. This may be done, for example, by increasing the amount of PTFE particles in the support material of the original electrode, or by adding PTFE particles to the additional layer, which may include a support material as described above for the original electrode. The diffusion resistance may also be adjusted by changing the porosity of the gas diffusion layer of the electrode and/or of the additional gas diffusion layer. Alternatively, the flow channels may face away from the anode or the cathode, respectively, so that the valley floor of the channel provides the additional thickness to achieve the same result. When this is done, the flow channels may be differentially spaced.

The electrochemical cell of the first and second embodiments also comprises an anode current bus 46 and a cathode current bus 48 as shown in FIG. 1. The current buses conduct current to and from a voltage source (not shown). Specifically, anode current bus 46 is connected to the positive terminal of a voltage source, and cathode current bus 48 is connected to the negative terminal of the voltage source, so that when voltage is supplied to the cell, current flows through all of the cell components to the right of current bus 46 as shown in FIG. 1, including current bus 48, from which it returns to the voltage source. The current buses are made of a conductor material, such as copper.

The electrochemical cell of the first and second embodiments further comprises a current distributor disposed in contact with the flow field. An anode current distributor 40 is disposed in contact with anode flow field 28, and a cathode current distributor 42 is disposed in contact with cathode flow field 30. The anode current distributor collects current from the anode bus and distributes it to the anode by electronic conduction. The cathode current distributor collects current from the cathode and distributes it to the cathode bus. The anode and the cathode current distributors preferably each comprise a non-porous layer. The anode current distributor provides a barrier between the anode current bus and the anode, and the anhydrous hydrogen halide, such as hydrogen chloride, and the halogen gas, such as chlorine. The cathode current distributor provides a barrier between the cathode current bus and the cathode and the hydrogen halide. This barrier is desirable, as there is some migration of hydrogen halide through the membrane. The current distributors of the present invention may be made of a variety of materials, and the material used for the anode current distributor need not be the same as the material used for the cathode current distributor. In one instance, the anode current distributor is made of platinized tantalum, and the cathode current distributor is made of a nickel-based alloy, such as UNS10665, sold as HASTEL-LOY® B-2, by Haynes, International.

In the first and second embodiments, the electrochemical cell also comprises a conductive structural support 44 disposed in contact with anode current distributor 40. The support on the anode side is preferably made of UNS31603 (316L stainless steel). A seal 45, preferably in the form of an O-ring made from a perfluoroelastomer, sold in parts under the trademark KALREZ® by DuPont, is disposed between structural support 44 on the anode side and anode current distributor 40. The cathode current distributor acts as a corrosion-resistant structural backer on the cathode side. This piece can be drilled and tapped to accept the PFA fitting, which is used for the inlet and outlet.

When more than one anode-cathode pair is used, such as in manufacturing, a bipolar arrangement, as familiar to one skilled in the art, is preferred. The electrochemical cell of the present invention may be used in a bipolar stack. To create such a bi-polar stack, current distributors 40 and 42 and all the elements disposed in between as shown in FIG. 1 are repeated along the length of the cell, and current buses are placed on the outside of the stack.

Further in accordance with the first and second embodiments of the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. However, as noted above, hydrogen fluoride may be particularly corrosive when used with the present invention. The production of bromine gas and iodine gas can be accomplished when the electrochemical cell is run at elevated temperatures (i.e., about 60 C and above for bromine and about 190° C. and above for iodine). In the case of iodine, a membrane other than NAFION® should be used.

The operation of the electrochemical cell for the first embodiment, where hydrogen, as well as chlorine gas, is produced by the cell, will now be described as it relates to a preferred embodiment of the process of the present invention, where the anhydrous hydrogen halide is hydrogen chloride. In operation, current flows to the anode bus and anode current distributor 40 collects current from the anode bus and distributes it to the anode by electronic conduction. Molecules of essentially anhydrous hydrogen chloride gas are fed to anode-side inlet 14 and through flow channels 29 in the anode mass flow field 28 and are transported to the surface of anode 12. The molecules are oxidized at the anode under the potential created by the voltage source to produce essentially dry chlorine gas ($Cl_2(g)$) at the anode, and protons ($H^+$). This reaction is given by the equation:

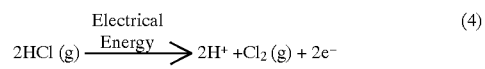

$$2HCl\,(g) \xrightarrow{\text{Electrical Energy}} 2H^+ + Cl_2\,(g) + 2e^- \qquad (4)$$

The chlorine gas ($Cl_2(g)$) exits through anode-side outlet 16 as shown in FIG. 1. The protons ($H^+$) are transported through the membrane, which acts as an electrolyte. The transported protons are reduced at the cathode. This reaction for the first embodiment is given by the equation:

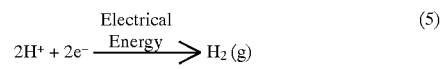

$$2H^+ + 2e^- \xrightarrow{\text{Electrical Energy}} H_2\,(g) \qquad (5)$$

Water is delivered to the cathode through cathode-side inlet 24 and through the grooves in cathode flow field 30 to hydrate the membrane and thereby increase the efficiency of proton transport through the membrane. In the first embodiment, the hydrogen which is evolved at the interface between the electrode and the membrane exits via cathode-side outlet 26 as shown in FIG. 1. The hydrogen bubbles through the water and is not affected by the PTFE in the electrode. Cathode current distributor 42 collects current from cathode 20 and distributes it to cathode bus 46.

The operation of the electrochemical cell according to the second embodiment will now be described as it relates to a preferred embodiment of the process of the present invention, where the anhydrous hydrogen halide is hydrogen chloride. In operation, current flows to the anode bus and anode current distributor 40 collects current from the anode bus and distributes it to the anode by electronic conduction. Molecules of essentially anhydrous hydrogen chloride are fed to anode-side inlet 14 and are transported through grooves of anode mass flow field 28 to the surface of anode 12. An oxygen-containing gas, such as oxygen ($O_2(g)$), air or oxygen-enriched air (i.e., greater than 21 mol % oxygen in nitrogen) is introduced through cathode-side inlet 24 and through the grooves formed in cathode mass flow field 30. Although air is cheaper to use, cell performance is enhanced when enriched air or oxygen is used. This cathode feed gas may be humidified to aid in the control of moisture in the membrane. Molecules of the hydrogen chloride (HCl(g)) are oxidized under the potential created by the voltage source to produce essentially dry chlorine gas at the anode, and protons ($H^+$), as expressed in equation (4) above. The chlorine gas ($Cl_2$) exits through anode-side outlet 16 as shown in FIG. 1. The protons ($H^+$) are transported through the membrane, which acts as an electrolyte. Oxygen and the transported protons are reduced at the cathode to water, which is expressed by the equation:

½ $O_2(g) + 2e^- + 2H^+ \rightarrow H_2O(g)$ (6)

The water formed ($H_2O(g)$ in equation (6)) exits via cathode-side outlet 26 as shown in FIG. 1, along with any nitrogen and unreacted oxygen. The water also helps to maintain hydration of the membrane, as will be further explained below. Cathode current distributor 42 collects current from cathode 20 and distributes it to cathode bus 48.

In this second embodiment, the cathode reaction is the formation of water. This cathode reaction has the advantage of more favorable thermodynamics relative to $H_2$ production at the cathode as in the first embodiment. This is because the overall reaction in this embodiment, which is expressed by the following equation:

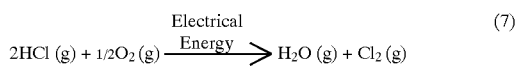

$$2HCl(g) + 1/2 O_2(g) \xrightarrow{\text{Electrical Energy}} H_2O(g) + Cl_2(g) \quad (7)$$

involves a smaller free-energy change than the free-energy change for the overall reaction in the first embodiment, which is expressed by the following equation:

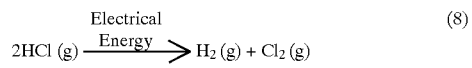

$$2HCl(g) \xrightarrow{\text{Electrical Energy}} H_2(g) + Cl_2(g) \quad (8)$$

Thus, the amount of voltage or energy required as input to the cell is reduced in this second embodiment.

In the first and second embodiments, the cathode-side of the membrane must be kept hydrated in order to increase the efficiency of proton transport through the membrane. In the first embodiment, which has a hydrogen-producing cathode, the hydration of the membrane is obtained by keeping liquid water in contact with the cathode. The liquid water passes through the gas-diffusion electrode and contacts the membrane. In the second embodiment, which has a water-producing cathode, the membrane hydration is accomplished by the production of water as expressed by equation (6) above and by the water introduced in a humidified oxygen-feed or air-feed stream. This keeps the conductivity of the membrane high.

In the first and second embodiments, the electrochemical cell of the present invention can be operated over a wide range of temperatures. Room temperature operation is an advantage, due to the ease of use of the cell. However, operation at elevated temperatures provides the advantages of improved kinetics and increased electrolyte conductivity. Higher temperatures result in lower cell voltages. However, limits on temperature occur because of the properties of the materials used for elements of the cell. For example, the properties of a NAFION® membrane change when the cell is operated above 120° C. The properties of a polymer electrolyte membrane make it difficult to operate a cell at temperatures above 150° C. With a membrane made of other materials, such as a ceramic material like beta-alumina, it is possible to operate a cell at temperatures above 200° C.

Figure 2:
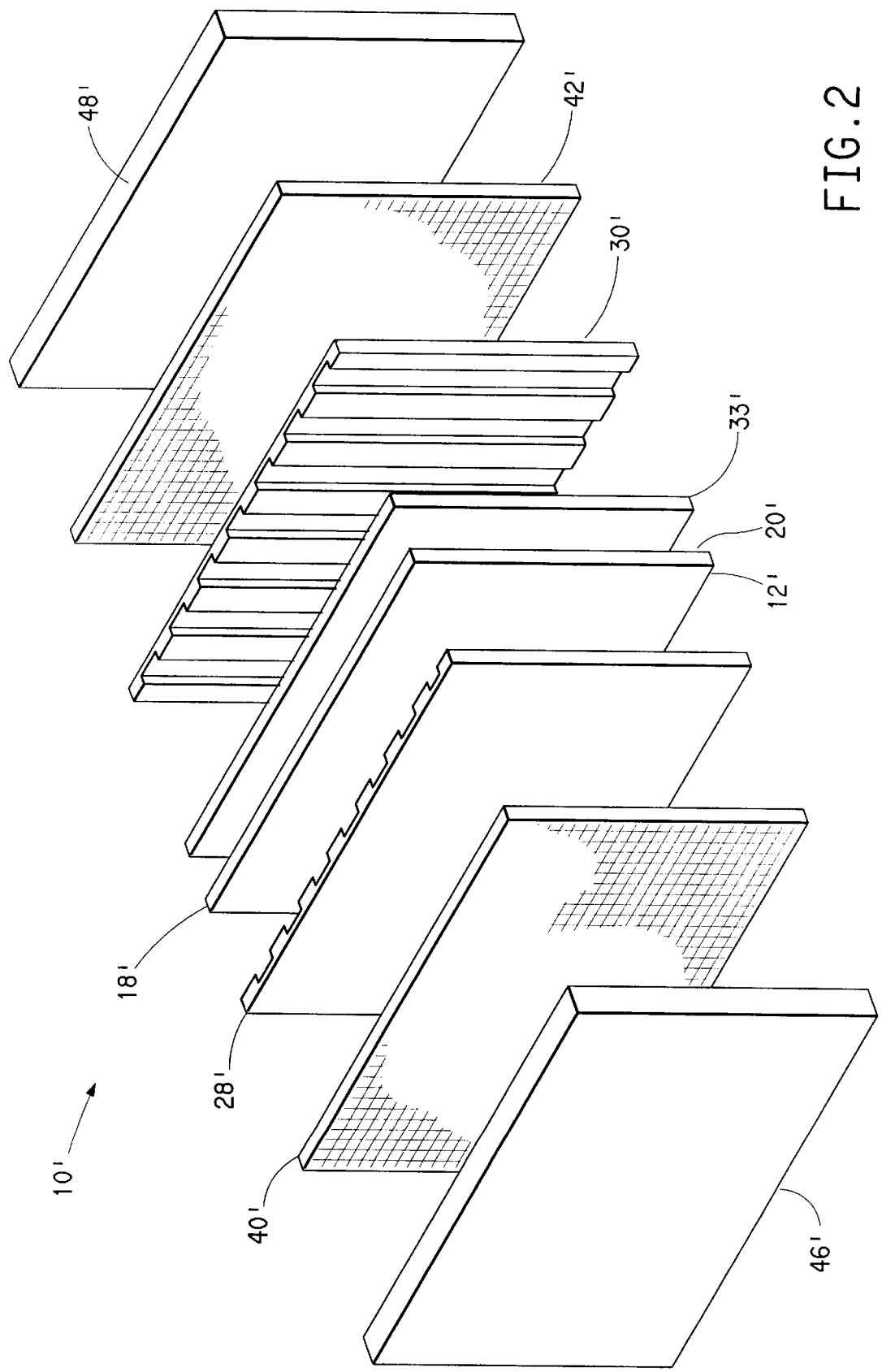
FIG. 2 is a perspective view of an electrochemical cell for producing, for example, halogen gas from aqueous hydrogen halide according to a third embodiment of the present invention.

FIG. 2 illustrates a third embodiment of the present invention. Wherever possible, elements corresponding to the elements of the embodiment of FIG. 1 will be shown with the same reference numeral as in FIG. 1, but will be designated with a prime ('). An electrochemical cell of the third embodiment is shown generally at 10' in FIG. 2. The electrochemical cell of the third embodiment will be described with respect to a preferred embodiment, where halogens, such as chlorine, are generated by the electrolysis of an aqueous solution of a hydrogen halide, such as hydrochloric acid. However, one could also use this cell for other uses, for instance, in a chlor-alkali system, with brine and hydrochloric acid. Alternatively, this cell could be used as a fuel cell.

The electrochemical cell of the third embodiment comprises an electrode, or more specifically, an anode 12'. The electrochemical cell of the third embodiment also comprises a membrane disposed in contact with one side of the electrode. A membrane 18' is shown in FIG. 2 having one side disposed in contact with one side of anode 12'. Unlike the membrane in the first embodiment, the membrane need not necessarily be a cation-transporting membrane. The electrochemical cell of the third embodiment also comprises an electrode, or more specifically, a cathode 20', where cathode 20' is disposed in contact with the other side (as opposed to the side which is in contact with the anode) of membrane as illustrated in FIG. 2.

The electrochemical cell of the third embodiment further comprises a mass flow field disposed in contact with the electrode. The mass flow field may be an anode mass flow field 28' disposed in contact with the anode, or a cathode mass flow field 30' disposed in contact with the cathode. The mass flow fields act as both mass and current flow fields. The purpose of the anode flow field is to get anolyte, such as aqueous HCl in the third embodiment to the anode and products, such as wet chlorine gas, from the anode. The purpose of the cathode flow field is to get catholyte to and product, such as hydrogen gas, from the cathode. More specifically, the mass flow fields include flow channels 29' and 31' as shown in FIG. 2.

The electrochemical cell of the third embodiment also includes an additional gas diffusion layer 33' as shown in FIG. 2. This additional diffusion layer increases the gas diffusion resistance of the fluid in the electrode compartment, as described above for the first two embodiments. As in the first two embodiments, additional gas diffusion layer 33' may be disposed between the cathode and the cathode flow field, or between the anode and the anode flow field, although it is only shown on the cathode side.

The electrochemical cell of the third embodiment also comprises a current bus for conducting current to the electrode, where the current bus is disposed on the other side of the electrode. An anode current bus 46' and a cathode current bus 48' are shown in FIG. 2. The current buses conduct current from a voltage source (not shown). Specifically, anode current bus 46' is connected to the positive terminal of a voltage source, and cathode current bus 48' is connected to the negative terminal of the voltage source, so that when voltage is supplied to the cell, current flows from the voltage source through all of the elements to the right of current bus 46' as shown in FIG. 2, including current bus 48' from which it returns to the voltage source. As in the first two embodiments, the current buses of the third embodiment are made of a conductor material, such as copper.

The electrochemical cell of the third embodiment further comprises a current distributor disposed on one side of the electrode. An anode current distributor 40' is disposed on one side of anode 12', and a cathode current distributor 42' is disposed on one side of cathode 20'. As in the first two embodiments, the anode current distributor collects current from the anode bus and distributes to the anode by electronic conduction. The cathode current distributor collects current from the cathode and distributes it to the cathode bus. The anode and the cathode current distributors preferably each comprise a non-porous layer. Moreover, as in the first two embodiments, the anode current distributor provides a barrier between the anode current bus and the anode, and also the reactant, such as aqueous hydrogen chloride and the product, such as wet gaseous chlorine. The cathode current distributor provides a barrier between the cathode current bus and the cathode, and also the catholyte. The current distributors of third embodiment may be made of a variety of materials, and the material used for the anode current distributor need not be the same as the material used for the cathode current distributor. The choice of material would depend on the choice of anolte and catholyte.

As known to one skilled in the art, if electrodes are placed on opposite faces of membrane, cationic charges (protons in the HCl reaction being described) are transported through the membrane from anode to cathode, while each electrode carries out a half-cell reaction. In the third embodiment, hydrochloric acid, which is introduced at the anode-side inlet (not shown) is electrolyzed at anode 12' to produce gaseous chlorine, which exits at the anode-side outlet (also not shown), and hydrogen ions ($H^+$). The $H^+$ ions are transported across membrane 18', to cathode 20' along with some water and some hydrochloric acid. The hydrogen ions are discharged at the cathode through a cathode-side outlet (not shown).

The invention will be clarified by the following Examples, which are intended to be purely examplary of the invention. The electrode/membrane assemblies used in the following Examples are commercially available from Giner, Inc. of Waltham, Mass., as membrane and electrode assemblies containing 0.33 mg. of ruthenium oxide per $cm.^2$ and integrally bonded to a NAFION® 117 membrane in the $H^+$ form.

EXAMPLE 1

A 315 square centimeter (i.e., 7 in.×7 in.) electrolytic cell having a NAFION® 117 membrane electrode assembly (MEA) was assembled with an additional gas diffusion layer having a thickness of 0.020 in. The additional gas diffusion layer was made of graphite paper. The MEA cathode catalyst was supported on a support structure, or layer, of graphite paper which had a thickness of 0.003 in. The combined gas diffusion layer was equal to 0.023 in. Anhydrous HCl was fed to the anode-side inlet of the cell while deionized water was fed to the cathode-side inlet.

Upon application of a cell voltage of 2.16 VDC by means of an external power supply, the maximum current which could be sustained was 60 A (180 ASF). As long as there was a stoichiometric amount of anhydrous HCl gas feed and an applied cell voltage of 2.16 VDC, the current drawn by the electrochemical cell became self regulating. That is, when either or both the anhydrous HCl gas feed or the applied cell voltage were increased, the cell current initially rose anywhere from 75 to 105 A, and then returned to a constant current of 60 A in less than one hour without any intervention.

EXAMPLE 2

In a control example, when a similar electrochemical cell was assembled having only a cathode catalyst support layer, or structure, of 0.010 in. and no additional cathode graphite paper gas diffusion layer, the electrochemical cell drew up to 300 A (900 ASF) at 2.25 VDC and an anhydrous HCl feed rate equal to or in excess of the stoichiometric amount.

These Examples show that by simply adding an additional layer of an appropriate gas diffusion material to an electrochemical cell, the cell may become self-regulating with respect to the maximum steady state current which the cell may draw. In turn, an electrochemical cell may be designed in which a valuable component such as the cation-exchange membrane is protected from prolonged exposure to excessive current, which could deteriorate the membrane and impact the membrane, and thus the cell's, long term performance.

Additional advantages and modifications will readily occur to those skilled in the art. The invention, in its broader aspects, is, therefore, not limited to the specific details, representative apparatus and illustrative Examples shown and described. Accordingly, departures may be made from such details without departing from the spirit or scope of the general inventive concept as defined by the appended claims and their equivalents.

What is claimed is:

1. An electrochemical cell for directly producing essentially dry halogen gas from essentially anhydrous hydrogen halide, comprising:
   (a) means for oxidizing molecules of essentially anhydrous hydrogen halide to produce essentially dry halogen gas and protons;
   (b) cation-transporting means for transporting the protons therethrough, wherein one side of the cation-transporting means is disposed in contact with one side of the oxidizing means;
   (c) means for reducing the transported protons, wherein one side of the reducing means is disposed in contact with the cation-transporting means and the reducing means has a compartment for containing a fluid therein;
   (d) a mass flow field disposed on the other side of the reducing means for directing fluid to and away from the reducing means; and
   (e) means disposed between the reducing means and the mass flow field for increasing the diffusion resistance of the fluid.

2. The electrochemical cell of claim 1, wherein the fluid is water.

3. The electrochemical cell of claim 1, wherein the oxidizing means is an anode, the cation-transporting means is a membrane and the reducing means is a cathode and the diffusion resistance means is a gas diffusion layer.

4. The electrochemical cell of claim 3, wherein the gas diffusion layer comprises graphite paper.

5. The electrochemical cell of claim 3, further including an inlet disposed at the cathode-side of the membrane.

6. The electrochemical cell of claim 5, further including an anode mass flow field disposed in contact with the anode, and the mass flow field disposed on the other side of the reducing means is a cathode mass flow field.

7. The electrochemical cell of claim 6, wherein the anode and the cathode mass flow fields have flow channels formed therein, and the flow channels of the cathode mass flow field are disposed in fluid communication with the cathode-side inlet, and further wherein the flow channels of the anode mass flow field and the flow channels of the cathode mass flow field are parallel to each other.

8. The electrochemical cell of claim 7, wherein the flow channels of the anode mass flow field and of the cathode mass flow field are both vertical.

9. The electrochemical cell of claim 7, wherein each of the anode and the cathode comprise an electrochemically active material.

10. The electrochemical cell of claim 9, wherein the anode and the cathode are gas diffusion electrodes.

11. The electrochemical cell of claim 10, wherein the catalyst loading of the electrochemically active material is in the range of 0.10 to 0.50 mg/cm$^2$.

12. The electrochemical cell of claim 9, wherein the electrochemically active material comprises one of the following: platinum, ruthenium, osmium, rhenium, rhodium, iridium, palladium, gold, titanium and zirconium, and the oxides, alloys and mixtures thereof.

13. The electrochemical cell of claim 12, wherein the electrochemically active material is applied as a film from ink onto the membrane.

14. The electrochemical cell of claim 13, wherein the loading of the electrochemically active material is at least about 0.017 mg/cm$^2$.

15. The electrochemical cell of claim 12, wherein the cation-transporting membrane is a proton-transporting membrane.

16. The electrochemical cell of claim 15, wherein the proton-transporting membrane comprises a copolymer of tetrafluoroethylene and poly-sulfonyl fluoride vinyl either containing pendant sulfonic acid groups.

17. The electrochemical cell of claim 16, wherein the electrochemically active material of the anode and the cathode is platinum.

18. The electrochemical cell of claim 16, wherein the electrochemically active material of the anode is ruthenium oxide.

19. The electrochemical cell of claim 18, wherein the electrochemically active material of the cathode is platinum.

20. The electrochemical cell of claim 9, wherein the electrochemically active material is bonded to a support structure.

21. The electrochemical cell of claim 20, wherein the support structure comprises carbon paper.

22. The electrochemical cell of claim 20, wherein the support structure comprises graphite cloth.

23. The electrochemical cell of claim 20, wherein the electrochemically active material comprises a catalyst material on a support material.

24. The electrochemical cell of claim 23, wherein the support material comprises particles of carbon and particles of polytetrafluoroethylene.

25. The electrochemical cell of claim 24, wherein the electrochemically active material is bonded by the particles of polytetrafluoroethylene to the support structure.

* * * * *

UNITED STATES PATENT AND TRADEMARK OFFICE
CERTIFICATE OF CORRECTION

PATENT NO. : 5,863,395
DATED : January 26, 1999
INVENTOR(S) : Mah et al.

It is certified that error appears in the above-identified patent and that said Letters Patent is hereby corrected as shown below:

Claim 9, line 2, in place of "comprise" should appear --comprises--.

Signed and Sealed this

Twenty-first Day of September, 1999

Attest:

Q. TODD DICKINSON

*Attesting Officer*      *Acting Commissioner of Patents and Trademarks*